US012592986B2

(12) United States Patent
Edelmann et al.

(10) Patent No.: US 12,592,986 B2
(45) Date of Patent: Mar. 31, 2026

(54) COMPUTER SYSTEM AND METHOD WITH REFERRAL TRACKING FOR SHARED CONTENT

(71) Applicants: Achim Edelmann, Bern (CH); Christian Müller, Schöfflisdorf (CH)

(72) Inventors: Achim Edelmann, Sahlistrasse (CH); Christian Müller, Bern (CH); Marco Bastos, Dublin (IE)

(73) Assignees: Achim Edelmann, Bern (CH); Christian Müller, Schöfflisdorf (CH)

( * ) Notice: Subject to any disclaimer, the term of this patent is extended or adjusted under 35 U.S.C. 154(b) by 0 days.

(21) Appl. No.: 18/419,268

(22) Filed: Jan. 22, 2024

(65) Prior Publication Data

US 2024/0163240 A1 May 16, 2024

Related U.S. Application Data

(63) Continuation of application No. PCT/EP2022/067486, filed on Jun. 27, 2022.

(51) Int. Cl.
| | |
|---|---|
| *G06F 16/955* | (2019.01) |
| *H04L 67/02* | (2022.01) |
| *H04L 67/50* | (2022.01) |

(52) U.S. Cl.
CPC .......... *H04L 67/535* (2022.05); *G06F 16/955* (2019.01); *G06F 16/9566* (2019.01); *H04L 67/02* (2013.01)

(58) Field of Classification Search
CPC ..... H04L 67/535; H04L 67/02; G06F 16/955; G06F 16/9566; G06F 16/958
See application file for complete search history.

(56) References Cited

U.S. PATENT DOCUMENTS

| | | | | |
|---|---|---|---|---|
| 8,190,711 | B1 * | 5/2012 | Borodich | G06F 16/958 |
| | | | | 709/219 |
| 2002/0165955 | A1 | 11/2002 | Johnson et al. | |
| 2004/0030780 | A1 * | 2/2004 | Walters | G06F 16/9566 |
| | | | | 707/E17.115 |

(Continued)

OTHER PUBLICATIONS

International Search Report and Written Opinion for PCT Application No. PCT/EP2022/067486, mailed on Sep. 29, 2022, 13 pages.

*Primary Examiner* — Johnny B Aguiar
(74) *Attorney, Agent, or Firm* — Brake Hughes Bellermann LLP

(57) ABSTRACT

A tracking server may receive, from a requester, a content request for accessing a content element on a content server. The content request includes a request Uniform Resource Locator ("URL") with at least a content identifier specifying the requested content element on the content server, and a request referral identifier. If the content identifier does not refer to a content element provided on the content server, an error response is sent. If the content identifier refers to a content element provided on the content server, a new and unique referral identifier associated with the content request is generated. Further, a new and unique referral URL for the content request is generated as a response URL comprising the received content identifier and the newly generated unique referral identifier. The requested content element is then served to the requester under the response URL.

17 Claims, 10 Drawing Sheets

(56)     References Cited

U.S. PATENT DOCUMENTS

| | | | |
|---|---|---|---|
| 2008/0288325 A1* | 11/2008 | Pavlov | G06Q 30/0277 |
| | | | 705/14.54 |
| 2009/0282052 A1* | 11/2009 | Evans | G06Q 30/02 |
| 2011/0107241 A1 | 5/2011 | Moore | |
| 2013/0227057 A1* | 8/2013 | Goldstein | H04L 12/1831 |
| | | | 709/217 |
| 2015/0372885 A1* | 12/2015 | Chun | G06F 16/9566 |
| | | | 709/224 |
| 2017/0286558 A1* | 10/2017 | Kelleher | G06F 11/323 |
| 2018/0330400 A1* | 11/2018 | Palmer | G06Q 30/0247 |
| 2019/0044902 A1 | 2/2019 | Teplow et al. | |
| 2021/0058475 A1* | 2/2021 | Chen | G06F 16/955 |

* cited by examiner

| R-ID | URL$_{req}$ | URL$_{res}$ |
|---|---|---|
| ... | ... | A |
| 1 | A | B |
| 2 | B | C |
| 3 | B | D |
| 3 | B | E |
| 3 | E | F |
| ... | ... | ... |

TDS 152

TDS 152'

| R-ID | $URL_{req}$ | $URL_{res}$ |
|------|------|------|
| ... | ... | A |
| 1 | A | B |
| 2 | B | C |
| 3 | B | D |
| 3 | B | D |
| ... | ... | ... |

FIG. 3C

TDS 153

| R-ID | $URL_{req}$ | $URL_{res}$ | $INF_{add}$ |
|------|------|------|------|
| ... | ... | A | ... |
| 1 | A | B | [IP address, time, client information, geolocation, *site interaction*, ...] |
| 2 | B | C | [IP address, time, client information, geolocation, *site interaction*, ...] |
| 3 | B | D | [IP address, time, client information, geolocation, *site interaction*, ...] |
| 4 | D | E | [IP address, time, client information, geolocation, *site interaction*, ...] |
| ... | ... | ... | |

FIG. 3D

COMPUTER SYSTEM AND METHOD WITH REFERRAL TRACKING FOR SHARED CONTENT

CROSS REFERENCE TO RELATED APPLICATION

This application claims priority to, and is a continuation of, PCT/EP2022/067486 filed on Jun. 27, 2022 and entitled "Computer system and method with referral tracking for shared content," which in turn claims priority to EP Application No. 21187892.1 filed on Jul. 27, 2021, both of which are hereby incorporated by reference in their entireties.

TECHNICAL FIELD

The present description generally relates to tracking the sharing of content on the Internet, and in particular, relates to methods, computer program products and systems providing referral tracking for shared content.

BACKGROUND

Modern communication platforms such as WhatsApp®, Facebook®, and Twitter® have become important media for information dissemination via the Internet. Tracking how information of any kind is shared across such distributed and decentralized communication networks is severely hampered by scant data. This is due to at least two reasons: First, unlike the public channels on social networking platforms, personal messaging services often implement private channels that are inaccessible to third parties. Second, most personal messaging services are end-to-end encrypted. While it is thus possible to monitor who accesses information stored on the web (through services such as for example Google® Analytics), it is difficult to track whether and how content is shared between people via personal messaging services and their encrypted channels. This especially also concerns the ability to track repeated access and forwarding of information by the same people as well as loops within the same referral chains and crossings of different referral chains.

SUMMARY

Hence, there is a need for improved tracking of content sharing. This technical problem is solved by embodiments as claimed in the independent claims (computer system, computer-implemented system and computer program product). The herein disclosed approach describes a tracking server implemented by a computer system which is communicatively coupled with a content server and uses a particular tracking data structure to dynamically track forwarding in web page sharing networks.

In one embodiment, a computer-implemented method is provided for tracking the sharing of web-content provided by a content server. The method can be performed by said tracking server. Via an appropriate communication interface, the tracking server receives a content request from a requester. Typically, the requester uses a client (e.g., a Hypertext Transfer Protocol ("HTTP") client) for submitting content requests to a content server. In the herein disclosed embodiment, the tracking server acts as a kind of gateway for the content server. That is, each content request sent by a requester client with the destination of a particular content server is received by the tracking server associated with said content server. It is to be noted that a person skilled in the art can also implement functions of the tracking server as an integral part of the content server, or provide the tracking server functionality as a backend system. The received content request requests to access a particular content element on the content server. Thereby, the content request comprises a request Uniform Resource Locator ("URL") with at least a content identifier specifying the requested content element on the content server, and with a referral identifier (a code indicating whether the request URL was previously used as a response URL from the tracking server).

Upon receipt of the content request, the tracking server checks whether the received content identifier refers to a content element which is provided by the content server. In other words, the tracking server checks if the content identifier is valid in that a corresponding content element is actually existing on the content server. If the content identifier does not refer to a valid content element, the tracking server is sending an error response to the respective requester. For example, this can be a response with the HTTP-status code 404 (Page Not Found).

In case the content identifier refers to a valid content element, the tracking server generates a new and unique referral identifier associated with the content request. A "new and unique referral identifier" as used herein is a referral identifier which is not yet present in a tracking data structure which is associated with the tracking server and, together with the content identifier, used by the tracking server to keep track of so-called referral chains. A referral chain reflects the forwarding of referral URLs in a distributed and decentralized communication network.

The tracking server then generates a new and unique referral URL for the received content request. This new and unique referral URL is then used as a response URL (URLres) comprising the received content identifier and the newly generated unique referral identifier. The pair of the received request URL and the response URL is then added as a new data record to said tracking data structure. For example, the tracking data structure can be implemented by one or more conventional database tables in a relational database. The tracking data structure can be an integral component of the tracking server, or it may be stored at a remote storage location which is accessible by the tracking server.

Finally, the tracking server serves the requested content element to the requester under the response URL with the new and unique referral identifier. Serving the content element under the response URL is to be understood as enabling the requester to access the content under said response URL.

The disclosed approach for referral tracking makes sure that each time a content request is received by the tracking server, the tracking server checks if the received content request was based on a referral URL which was used before as a response URL. If this is the case, the tracking server knows that the content request either comes from a requester who already requested the respective content element in the past, or it comes from a requester who received the referral URL from another requester who requested said content element in the past. The latter corresponds to a scenario where the earlier requester shared the response URL under which the content element was served. When the tracking server receives a content request which includes such an earlier used response URL, the tracking server generates a new and unique referral URL which is then being used to respond to the content request. By storing the pair of the received request URL and the generated response URL as a new data record in the tracking data structure, the tracking server is ready to identify any future content request as a request which is based on such a content sharing scenario. Repeating the disclosed method for each newly received content request, the tracking data structure develops into a complete referral chain which allows to track exactly which of the received content requests originate from content sharing activities of requesters who accessed the respective content element earlier.

In this context, it is to be noted that an initialization of an originally empty tracking data structure can be made when the very first content request is received by the tracking server. In this case, even if the first content request includes a referral identifier, it is not possible that the referral identifier of this first content request is already present in the tracking data structure. Therefore, the tracking server generates a new and unique referral identifier which is the basis for the generation of a new and unique response URL. In the initialization scenario, the first record which is added to the tracking data structure may only include the generated response URL under which the requested content element is served to the first requester. Advantageously, also the request URL with the request referral identifier is stored in the tracking data structure, although not being relevant for the referral tracking purposes. It is to be noted that such initialization can be repeated each time when a content request is received that is not based on an earlier generated response URL. In such cases, the corresponding record added to the tracking data structure represents a root node of a new referral tree represented in the tracking data structure.

During operation of the tracking server, it may happen that content requests are received which are not the result of a content sharing activity by another requester but which simply occur because the requester of such a content request has launched the request on its own initiative (i.e., without using a referral URL). Such situations can be handled in the same way as the very first content request for initialization of the tracking data structure. In other words, the tracking server simply generates a new and unique response URL for said content request and stores the generated response URL in the tracking data structure, advantageously together with the received request URL. Such an "independent" content request results in an additional "root node" of a further referral tree stored in the tracking data structure.

In one embodiment, the tracking server may implement a blocking function to block content requests which are not based on earlier generated response URLs. In this embodiment, the tracking server has recognized that the received content request refers to a valid content element on the content server, the tracking server checks if the pair of request referral identifier and content identifier in the content request is already present in a response URL of a data record of the tracking data structure. If not, the content request is blocked by sending a respective error response to the requester. Otherwise, the tracking server simply continues with generating a new and unique referral identifier and finally serves the content element under the corresponding generated response URL (being a new and unique referral URL).

In one embodiment, the tracking server is enabled to perform referral tracking at the level of the various requesters. To achieve that purpose, in addition to the request URL(s) and referral URL(s) the tracking server uses requester identifiers. In this embodiment, if a content request is received which refers to a valid content element, the tracking server further checks if the content request also includes a requester identifier for said requester. If the received content request does not include such a requester identifier, the tracking server generates a new and unique requester identifier to be stored at the requester. Typically, such a requester identifier is then sent to the requester's client where it is stored as a Cookie or by using JavaScript localStorage objects. The new and unique requester identifier is generated before finally the tracking server is adding a new record associated with the received content request to the tracking data structure. This allows to store in this new data record either the new and unique requester identifier or the requester identifier already included in the received content request. With the requester identifier being part of referral tree information, the referral tracking becomes transparent at the requester level. Thereby, it becomes transparent, if certain requesters are more active than others because each new content request is associated with the respective originating content request in the tracking data structure, which reflects one or more referral trees, allowing to follow an entire branch of a particular tree up to certain parent nodes or even the root node. In such cases, the tracking data structure can even be used to track referrals across referral trees. The analysis of the records in the tracking data structure even allows to identify repeated visits of a requester, circular relations in the referral tree(s), or even crossings of referral paths and trees. Examples for each of such analysis types are given in the detailed description.

This embodiment can further be expanded to allow a more distinguished use of the response URL(s). In this embodiment, a new and unique referral identifier is not only generated if the received content request does not include a requester identifier, but also in cases where the received content request already includes a requester identifier but where for this included requester identifier no pair of the included requester identifier and the received content identifier is present in a record of the tracking data structure. That is, also in cases where a particular requester has requested a particular content element for the first time (i.e., no respective entry was recorded in the tracking data structure before), a new and unique referral identifier is generated for the received content request.

However, if the received content request includes a requester identifier for which a pair of said requester identifier and the received content identifier is already present in a corresponding record of the tracking data structure, the tracking server reuses the referral identifier from the corresponding record to generate the response URL. That is, in this embodiment, dependent on the requester identifier in the content request, the response URL is generated either with the received content identifier and the generated new and unique referral identifier, or with the received content identifier and the referral identifier of the corresponding record, respectively. The tracking server then adds the request URL, the response URL, and the respective requester identifier as a new data record to the tracking data structure and serves the requested content element to the requester under said response URL. In this embodiment, the same content request from the same requester always receives the same response URL. This allows to avoid the generation of unnecessary referral URLs and ensures consistency for the requester as they always receive the same URL. For example, in case a requester returns to an already earlier visited web page by using the back button of the browser, it may be advantageous to not generate a new response URL with each 'back' action of the requester but to reuse the same response URL which was used with the earlier visit. Other examples are given in the detailed description.

In one embodiment, the tracking server further receives additional information with the content request. For example, this additional information may not be part of the request URL but may be included in the request header of the content request. For example, the request header can be an HTTP header that is used in an HTTP request to provide information about the request context, so that the server can tailor the response. For example, Accept-* headers indicate the allowed and preferred formats of the response. Other headers can be used to supply authentication credentials (e.g. Authorization), to control caching, or to get information about the client or HTTP referrer. That is, the additional information specifies further properties associated with the content request. For example, the additional information may be associated with one or more of the following properties: Internet Protocol ("IP") address of the requester, time when the content request was submitted, information about the requester's client, geolocation associated with the origin of the content request, geolocation associated with the origin of the requester, and requester's site interaction history. In this embodiment, each new data record added to the tracking data base further includes the respective additional information received with the content request, or properties which are derived from said additional information. It is to be noted, that in this embodiment the tracking server may have a module which allows to invoke external services (provided by other computer systems) in real time to derive such properties from the additional information. For example, the tracking server may call a service which is able to derive a geolocation from the IP address or other additional information provided in the content request. The derived geolocation can then be stored with the respective new record in the tracking data structure. Another example of such an external service is an analytics service (e.g., Google® Analytics) which can be used by the tracking server to gather additional information on website requests, such as information on the respective users' interaction with a given website, including their purchasing behavior etc.

In one embodiment, the tracking server can use the additional information for changing its own response behavior. For this purpose, the tracking server may have an analysis module which is adapted to apply behavioral decision rules to the additional information, and, dependent on the additional information, can change the response behavior of the tracking server (conditional behavior setting for the tracking server). Dependent on the additional information, the content element may be served to the requester under the conditional behavior setting. For example, dependent on the additional information, the content element may be served to the requester either under the generated new and unique response URL or under a response referral URL already present in the tracking data structure. This embodiment allows for example, to use the same response URL for different requesters which may have certain properties in common (e.g., being located in a certain geographic area, showing certain interaction patterns, etc.). Further examples of conditional behavior settings are given in the detailed description. However, the conditional behavior setting may also be used to block the content request in that the tracking server does not serve a content element at all to the respective requester or sends a corresponding error message.

In one embodiment, a computer program product is provided for tracking the sharing of web-content provided by a content server. The computer program product has program instructions that, when loaded into a memory of a computing device (e.g., the tracking server) and executed by one or more processors of the computing device, cause the computing device to perform the method steps of the computer-implemented method as disclosed herein.

In one embodiment, a tracking server is provided for tracking the sharing of web-content provided by a content server. The tracking server has modules implemented by software which enable the tracking server to execute the herein disclosed method when processing a corresponding computer program.

Further aspects of the description will be realized and attained by means of the elements and combinations particularly depicted in the appended claims. It is to be understood that both, the foregoing general description and the following detailed description are exemplary and explanatory only and are not restrictive.

BRIEF DESCRIPTION OF THE DRAWINGS

FIGS. 3A to 3D illustrate examples of tracking data structures according to various embodiments;

DETAILED DESCRIPTION

Figure 1:
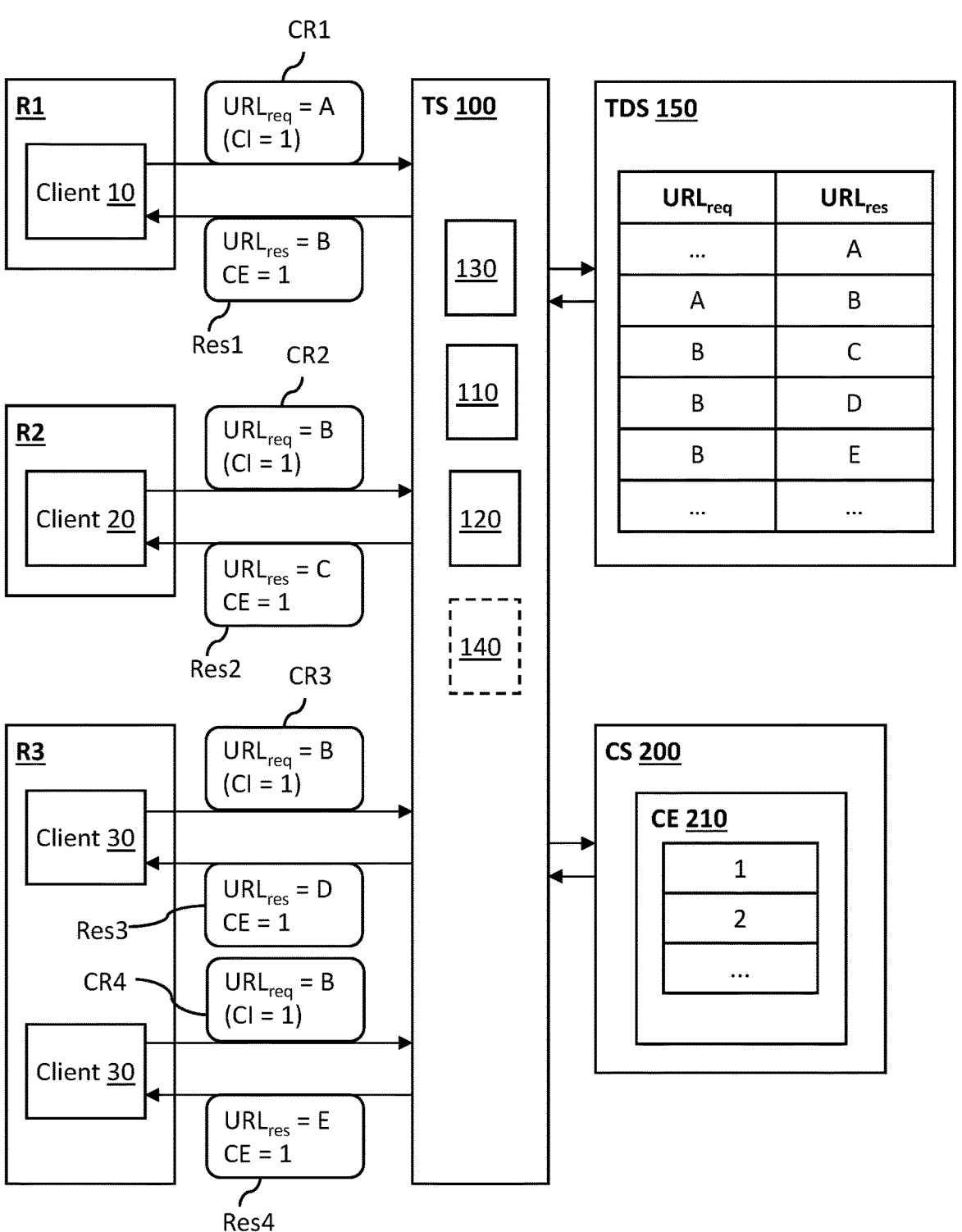
FIG. 1 shows a simplified diagram of an embodiment of a tracking server for tracking the sharing of web-content provided by a content server according to an embodiment.

FIG. 1 shows a simplified diagram of an embodiment of a tracking server 100 (TS) for tracking the sharing of web-content provided by a content server 200. FIGS. 2A to 2D show simplified flowcharts of a computer-implemented method 1000 for tracking the sharing of web-content provided by a content server 200 (CS), as well as optional embodiments 1000', 1000", and 1000''' of said method. The computer-implemented method can be performed by respective embodiments of the computer system 100. Therefore, FIG. 1 is described in the context of FIGS. 2A to 2D where the following description refers to reference numbers of FIG. 1 and FIGS. 2A to 2D.

The TS 100 is communicatively coupled with the CS 200 such that the tracking server can request and receive content elements 210 (CE) from CS 200. Further, TS 100 is communicatively coupled with a plurality of requesters R1 to R3 via an interface adapted to receive 1100 from any of the requesters R1 to R3 content requests CR1 to CR4 for accessing a respective content element (e.g., CE 210-1, 210-2) on the content server 200. Typically, the requesters use clients 10, 20, 30 to send their content requests to the tracking server. That is, TS 100 acts like a kind of gateway which receives and processes content requests actually directed to the content server. For example, the clients 10 to

30 may be implemented as HTTP clients (e.g., by a conventional browser) and the communication between TS 100 and the clients may be governed by an Internet communication protocol such as HTTP or HTTPS. Each content request provides a request URL (URLreq) to the tracking server. The request URL includes at least a content identifier CI and request referral identifier. The content identifier specifies the requested content element 210-1, 210-2 on the content server 200. For example, CI reflects a web address under which the requested content element can be found. The referral identifier (referral ID) is a code which has been previously generated by TS 100 such that it is guaranteed that the referral ID is unique within the URLres column of TDS 150 in FIG. 1. In the example, all requesters R1 to R3 request the same content element CE 210-1 ('1') with the respective content requests CR1 to CR4. However, the content requests are made under different request URLs because different request referral identifiers are included in the respective request URLs. For example, requester R1 is sending the content request CR1 with the URLreq=A whereas the content requests CR2 to CR4 of requesters R2 and R3 are sent with a different URLreq=B. In other words, the four content requests all include the same content identifier but URLreq=A and URLreq=B differ in the respective referral identifiers.

Once a content request CR1 has been received 1100 by TS 100 from the respective requester R1, a checker module 110 of TS 100 checks 1200 if the content identifier CR1 refers to a valid content element 210-1 provided on the content server 200. In the example, CS 200 stores CE 210-1 which matches the content identifier CI=1 indicated in CR1. In case the content identifier CI=1 would not refer to a valid content element, an error handling module 120 of TS 100 would simply send 1210 a corresponding error response to the respective requester R1. For example, a typical error response in this context is "page not found" or the like.

If the content identifier refers to a valid content element a response URL module 130 of TS 100 performs the following steps. The module 130 generates 1400 a new and unique referral identifier associated with the received content request CR1. Then, it generates 1500 a new and unique referral URL 'B' for the content request CR1 as a response URL (URLres). URLres 'B' includes the received content identifier (CE=1) and the newly generated unique referral identifier.

TS 100 is further commutatively coupled with a tracking data structure 150 (TDS). TDS 150 may be implemented as an internal database table of TS 100, or it may be accessible by TS 100 on a remote storage device. TS 100 is now adding 1600 the received request URL URLreq 'A' and the generated response URL URLres 'B' as a new data record to TDS 150. "Adding a new record" as used herein means that a new data record is appended to the tracking data structure. In the example of FIG. 1, the added data record corresponds to the second row of TDS 150 (A, B).

Finally, TS 100 serves 1700 the requested content element 210-1 ('1') to the requester R1 under URLres 'B' in response Res1.

These steps are then repeated for each new content request received by TS 100. In the example, R1 has shared the received response URL 'B' with the requesters R2 and R3 to also access CE 210-1 on CS 200. Therefore, when TS 100 receives CR2 from R2, CR2 includes the referral URL 'B' as the request URL URLreq. In response to this content request, TS 100 generates again a new and unique referral ID and a corresponding new and unique response URL 'C'. The corresponding new data record (B, C) is then added to TDS 150. The requested content element CE 210-1 is then served to R2 in response Res2.

Requester R3 also submits a content request CR3 to TS 100 which uses the shared referral URL 'B' as request URL. In response to CR3, TS 100 generates again a corresponding new and unique referral ID for generating a new and unique referral URL 'D' as response URL. The corresponding new data record (B, D) is added to TDS 150 and the requested content element CE 210-1 is served to R3 in response Res3 under the new response URL 'D'. In the example, R3 requests the same content element CE 201-1 (CI=1) again when sending content request CR4. Thereby, R3 is using again the request URL 'B' which had been shared by R1 earlier. It is to be noted that R3 could also have used the response URL 'D' from the response Res3 to its earlier content request CR3. However, as 'B' was used in CR4, TS 100 generates a corresponding new and unique referral ID and a respective new and unique response URL 'E'. The new data record (B, E) is then added to TDS 150 and the requested content element 210-1 is served to R3 in the response Res4 under the response URL 'E'.

Figure 1A:
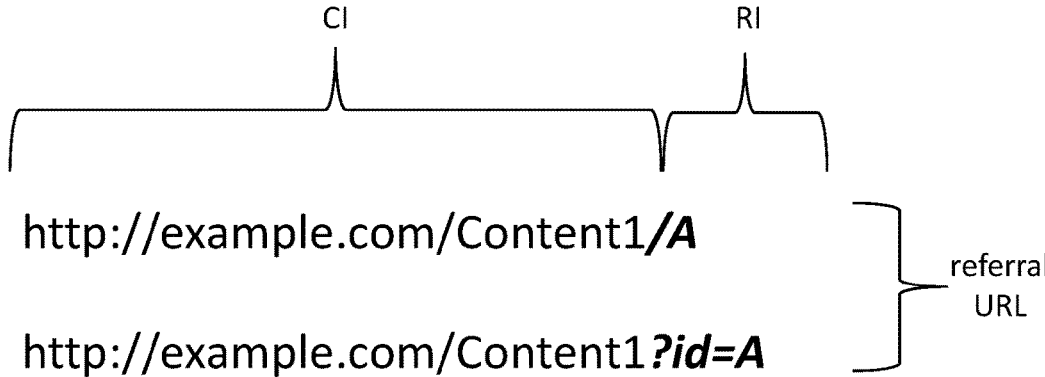
FIG. 1A illustrates examples of content identifiers and referral identifiers.
Figures 3A, 3B:
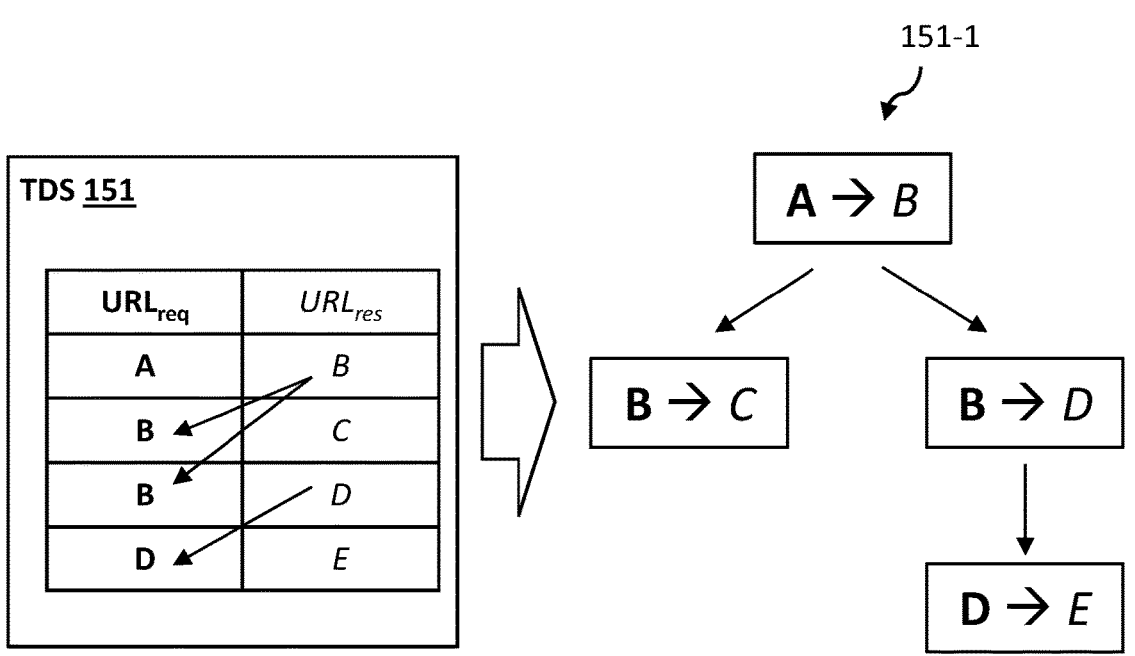

Turning briefly to FIG. 3A, another example of a tracking data structure TDS 151 is shown. As mentioned earlier, the requesters may use HTTP clients and the content requests may be HTTP requests. In response to such HTTP requests the TS 100 generates new and unique referral URLs by generating new and unique referral IDs and combining them with the respective content identifier of the corresponding received content request. The content identifier in the following examples is referred to as Content1. As illustrated by the following examples (cf. FIG. 1A), unique referral URLs can be generated in several ways including but not limited to:

http://example.com/Content1/A
http://example.com/Content1?id=A

In the examples, the part 'http://example.com/Content1' corresponds to the content identifier CI, and the parts '/A' and '?id=A' correspond to the respective referral identifier RI.

The second option is used to describe in more detail how TS 100 operates. For the content element 'Content1', referred to with the content ID http://example.com/Content1, TS 100 creates and uses new and unique referral URLs of the form http://example.com/Content1?id=A, http://example.com/Content1?id=B, http://example.com/Content1?id=C, http://example.com/Content1?id=D, and http://example.com/Content1?id=E.

In the example, a HTTP client sends a content request with request URL A http://example.com/Content1?id=A to the tracking server. The tracking server requests the content element associated with content ID http://example.com/Content1 from the content server. If the Content Server does not reply with the content element to this request by the tracking server, the tracking server responds with an error to the content request of the client. If the content server replies with a content element (i.e., the requested content element is valid), the tracking server continues processing the content request received from the client. It generates the new, unique Referral URL B http://example.com/Content1?id=B comprising the content ID http://example.com/Content1 and a newly generated, unique referral ID ?id=B. The tracking server then adds a record in the TDS 151 including (i) the request URL A and (ii) the generated new and unique referral URL B. Finally, the tracking server serves content element Content1 to the HTTP client of the requester under the new and unique referral URL B (URLres B).

As a result of this procedure, the TDS 151 contains the information necessary to track referral chains as exemplified in FIG. 3A. In the example of TDS 151, URLres B has been used for content sharing and resulted in two further content requests with URLreq B. The second of these two requests (3$^{rd}$ data record of TDS 151) was shared again as shown by the respective response URL D being used by a further content request as request URL. The data records of TDS 151 allow to reconstruct the dynamic chain for forwarding which is illustrated by the tree 151-1. In particular, it is possible to track that the content request with URLreq D for Content1 followed a referral URL shared by the requester of the content request with URLreq B, which in turn had followed a URL from the requester of the content request with URLreq A. Moreover, TDS 151 reveals that the content request with URLreq A triggered two additional content requests (B–>C and B–>D) and content request with URLreq B triggered one additional content request (D–>E).

Turning back to FIG. 1 and FIG. 2A, in an optional embodiment, the checker module 110 is further adapted to perform a further check 1300 which allows to block content requests if they are not trackable. Check 1300 checks if the pair of request referral identifier and content identifier in the received content request is already present in a response URL of a data record of TDS 150. If said pair is not present in TDS 150 it indicates that the received content request cannot be associated with an earlier received content request and is therefore not part of an already existing referral tree. In this case, the checker module 110 can call the error module 120 to send a corresponding error response to the respective requester, and therewith block the received content request. If the check 1300 is positive, the checker module calls the response URL module 130 to proceed with generating the new and unique referral identifier as described previously.

Figure 2A:
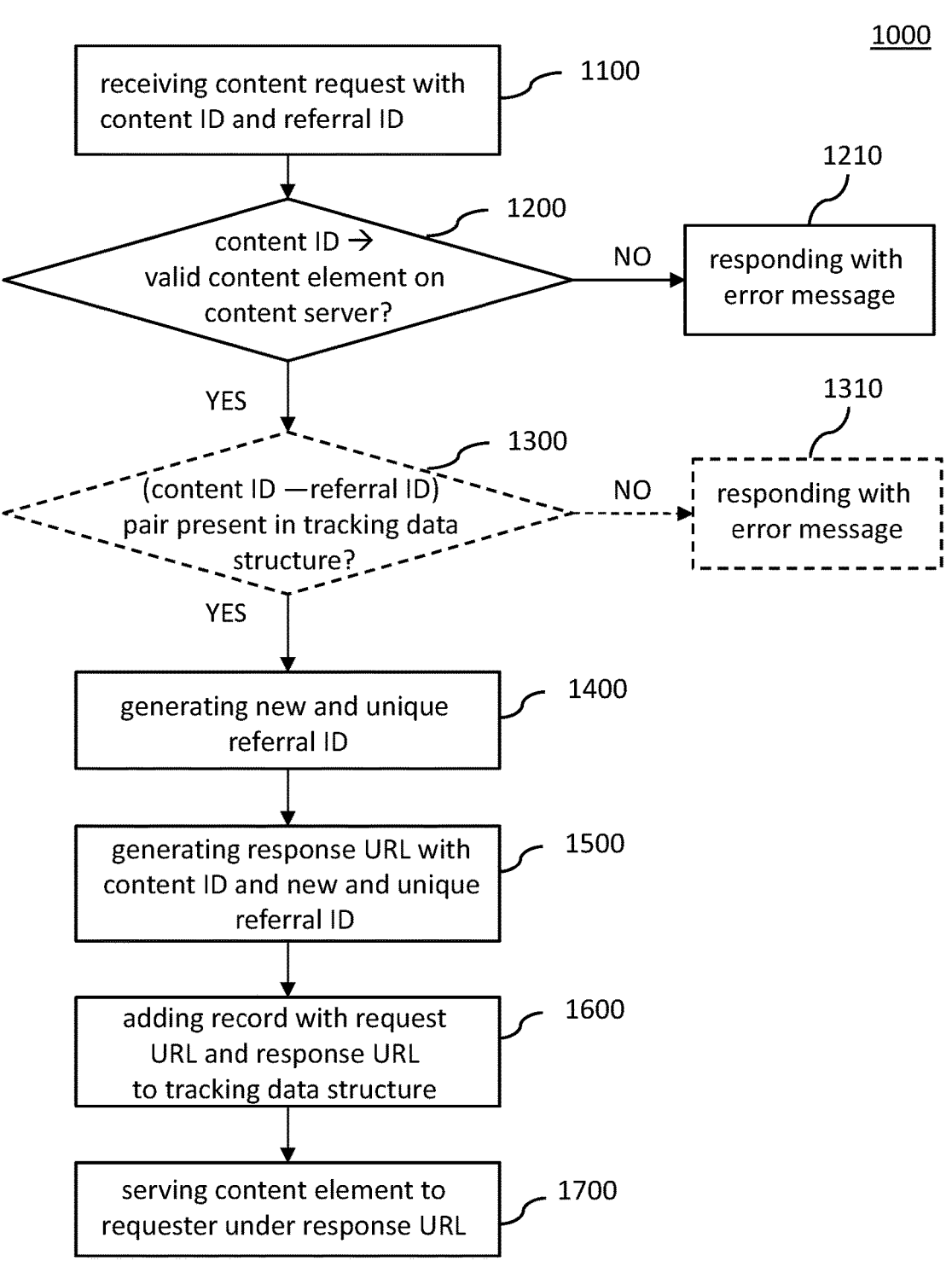
FIG. 2A is a simplified flowchart of a computer-implemented method for tracking the sharing of web-content provided by a content server which can be performed by embodiments of the tracking server computer system.
Figure 2B:
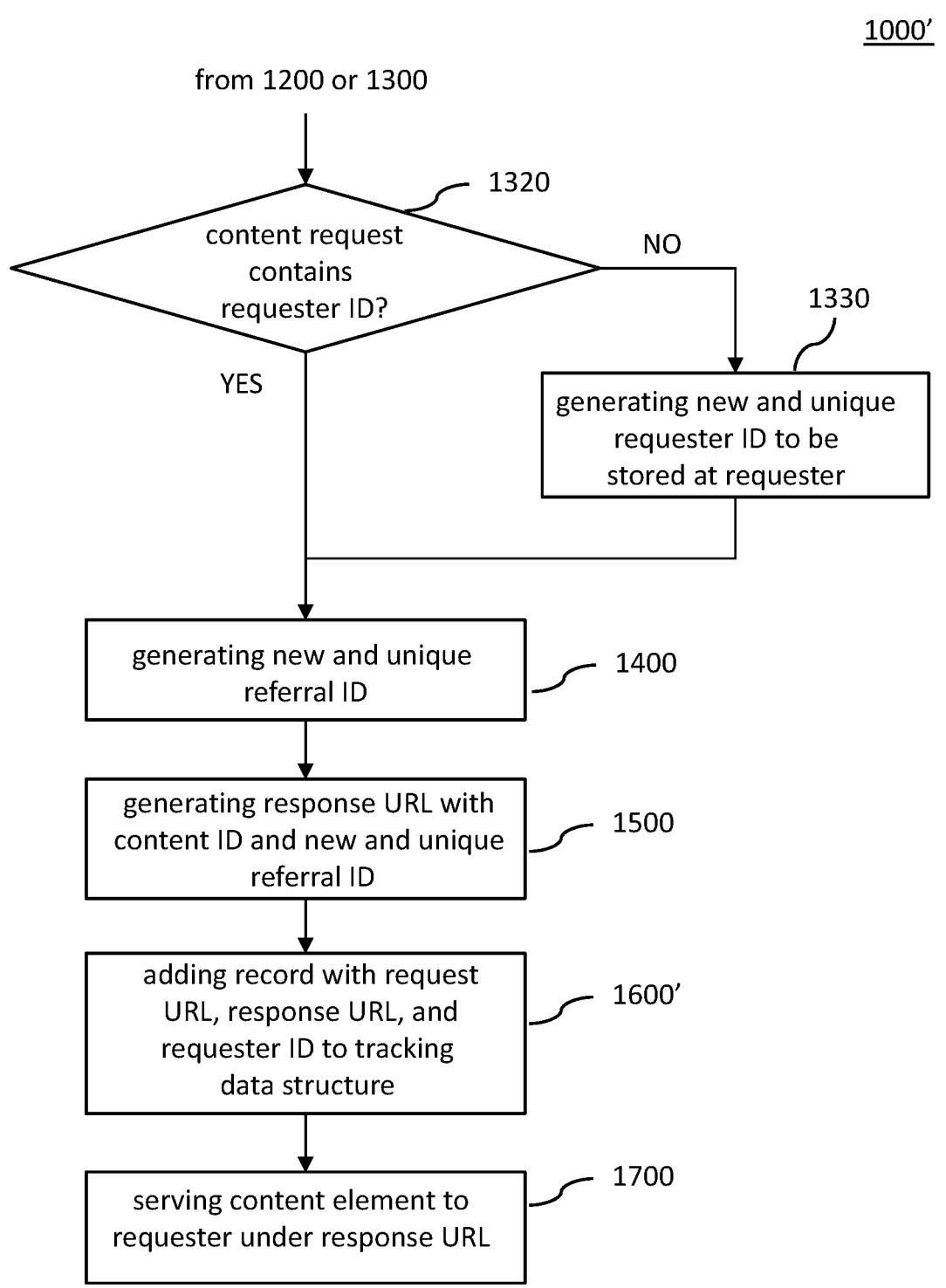
FIGS. 2B to 2D illustrate extensions of the simplified flowchart which implement further optional embodiments of the computer-implemented method.

FIG. 2B illustrates a further simplified flowchart 1000' illustrating an optional embodiment of method 1000. In this optional embodiment, after the checking step 1200 (or the optional checking step 1300), a further checking step 1320 is implemented by the checker module. In this further checking step 1320, the checker module 110 checks if the received content request further includes a requester identifier. A requester identifier is a unique identifier associated with the requester who submitted the content request.

In case the received content request does not include such a requester identifier, the response URL module 130 can generate a new and unique requester identifier to be stored at the requester. To store the generated requester identifier, for example, TS 100 may send a corresponding cookie to the requester's client to be stored in the browser. Alternatively, JavaScript localStorage objects may be used to store the requester identifier at the client. In this embodiment, adding step 1600 of FIG. 2A is slightly modified into adding step 1600' in that, in addition to the request and response URLs, the generated requester ID is also stored with the new data record added to the tracking data structure. In case the received content request already includes such a requester identifier, this requester identifier of the received content request is stored with the new data record in the tracking data structure in adding step 1600'.

Turning briefly to FIG. 3B, TDS 152 is an example tracking data structure which has been generated by the optional embodiment of FIG. 2B. In this embodiment, the referral tree(s) reflected by TDS 152 become transparent at the requester level through the additional column R-ID storing the requester identifier associated with the respective content request. This has technical implications which allow for referral tracking at a higher level of granularity.

For example, TDS 152 allows the tracking server to identify repeated visits and self-loops, i.e., repeated content requests submitted by the same client generated in response to the requester's previous content request for said content element. The data records (1, A, B), (2, B, C) and (3, B, D) reflect the sharing of a referral URL by a requester with R-ID '1' with two further requesters (R-IDs '2' and '3'). The data record (3, B, E) reflects a repeated visit of requester '3' with the shared referral URL 'B'. The data record (3, E, F) reflects a self-loop performed by the requester with R-ID '3'. Requester '3' has revisited the same content element based on the referral URL 'E' which was generated in response to the requester's previous content request for said content element.

Figure 4:
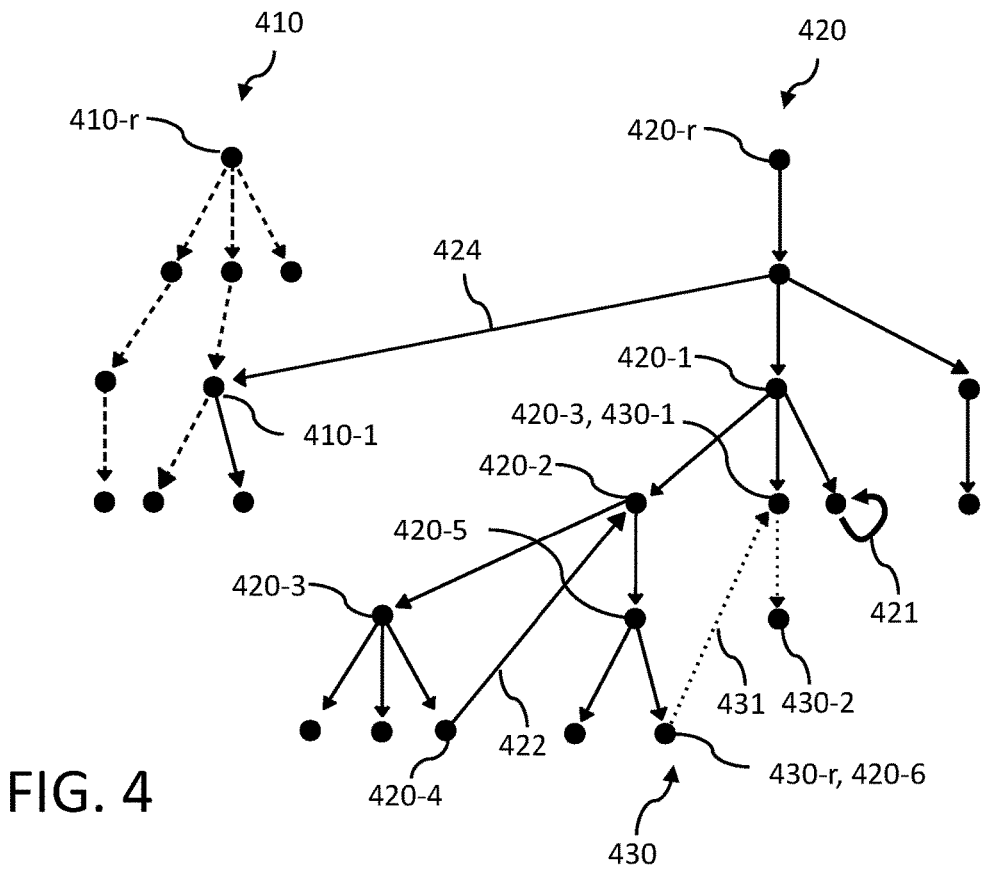
FIG. 4 illustrates analysis capabilities based on an example of three referral trees extracted from a tracking data structure.

FIG. 4 illustrates an example of referral trees 410, 420, 430 extracted from a tracking data structure with a format of TDS 152 with the extension of the tracking data structure by the requester ID associated with the corresponding content request. Different referral trees are illustrated by different line types. Each node in the trees 410, 420, 430 corresponds to a unique requester identifier (R-ID) and each arrow corresponds to a referral record in the TDS. It is to be noted that in tree 151-1 of FIG. 3A the nodes represented referrals because no requester identifiers were included in the respective records of TDS 151. Multiple referral trees in a TDS may exist when requesters had sent content requests with request URLs that had not been shared by other requesters before. In such cases, when no blocking is activated (cf. FIG. 2B), a new data record is added to the TDS which does not have a request URL that can be mapped on an already existing response URL. Such a situation leads to the creation of a root node 410-r, 420-r, 430-r of a new referral tree 410, 420, 430. It is to be noted that an initialization step of the TDS corresponds to the same procedure. When the TDS is empty before the very first content request is received by the tracking server, or when a content request which is not based on an earlier generated response URL is received from a requester, the corresponding added data record does not include a request URL which has been used before as response URL.

As can be seen in FIG. 4, referral trees which can be extracted from a tracking data structure like TDS 152 (cf. FIG. 3B) allow the tracking server to not only identify repeated visits by requester clients as well as self-loops 421. In the examples of FIG. 4 (and also FIG. 5 further down below) all illustrated referrals relate to the same content element. That is, the referral trees illustrate the sharing/visiting of said content element amongst/by a plurality of requesters. Besides self-loops, for example, also loops within referral trees as well as crossings of different referral trees can be identified. A loop in a referral tree 420 occurs when a content request from a requester in the referral tree 420-2 follows referrals from other clients 420-3, 420-4 further down the same tree 420. In other words, the last referral 422 of the loop (420-2, 420-3, 420-4, 420-2) is ending where the initial referral started. The referral represented by the dotted arrow 431 does not relate to a loop because it does not follow a referral which originated from 420-3. Rather, it represents part of an additional referral tree 430 with the root node 430-r. In the example, the root node 430-r (which is also a node 420-6 of referral tree 420) does not use the referral URL shared by 420-5. Rather, it shares 431 a new referral URL (generated on its own initiative) with 430-1. 430-1 is sharing a response URL with 430-2 which was generated based on the referral URL received via referral tree 430. 430-1 is also a node 420-3 in referral tree 420 where it received a referral URL from 420-1. However, this referral URL was not used by 430-1. As a result of using requester identifiers in the tracking data structure, the tracking server can identify whether the node 430-1, 420-3 has shared a referral from 430-r or 420-1. In the example, the reason why 430-1 has shared content based on the referral of 430-r instead of 420-1 may be that 430-1 has more trust in 430-r than in 420-1. Another reason may be that 430-1 decided to not share content before having received a referral from at least two different nodes (420-1 and 430-r). The tracking server can also identify whether a node, such as 430-r, 420-6, forwarded an earlier referral from 420-5 before or after sharing with 430-1 a referral based on a content request which was launched on its own initiative. It is to be noted that trust may be an important criterion for requesters to share content with other requesters in a communication platform. The tracking server can therefore derive from the referral trees information about which nodes appear to be trusted nodes and which nodes are rather non-trusted nodes.

A referral tree crossing may occur when a content request 410-1 of a requester in one referral tree 410 follows a referral 424 from a different referral tree 420. Analyses of loops and crossings allow to determine how information was spread through communication networks via the respective paths in the referral trees. This enables in particular the identification of requesters in the network who cause a high load on the communication network because of their high sharing activities (information hubs).

Figure 2C:
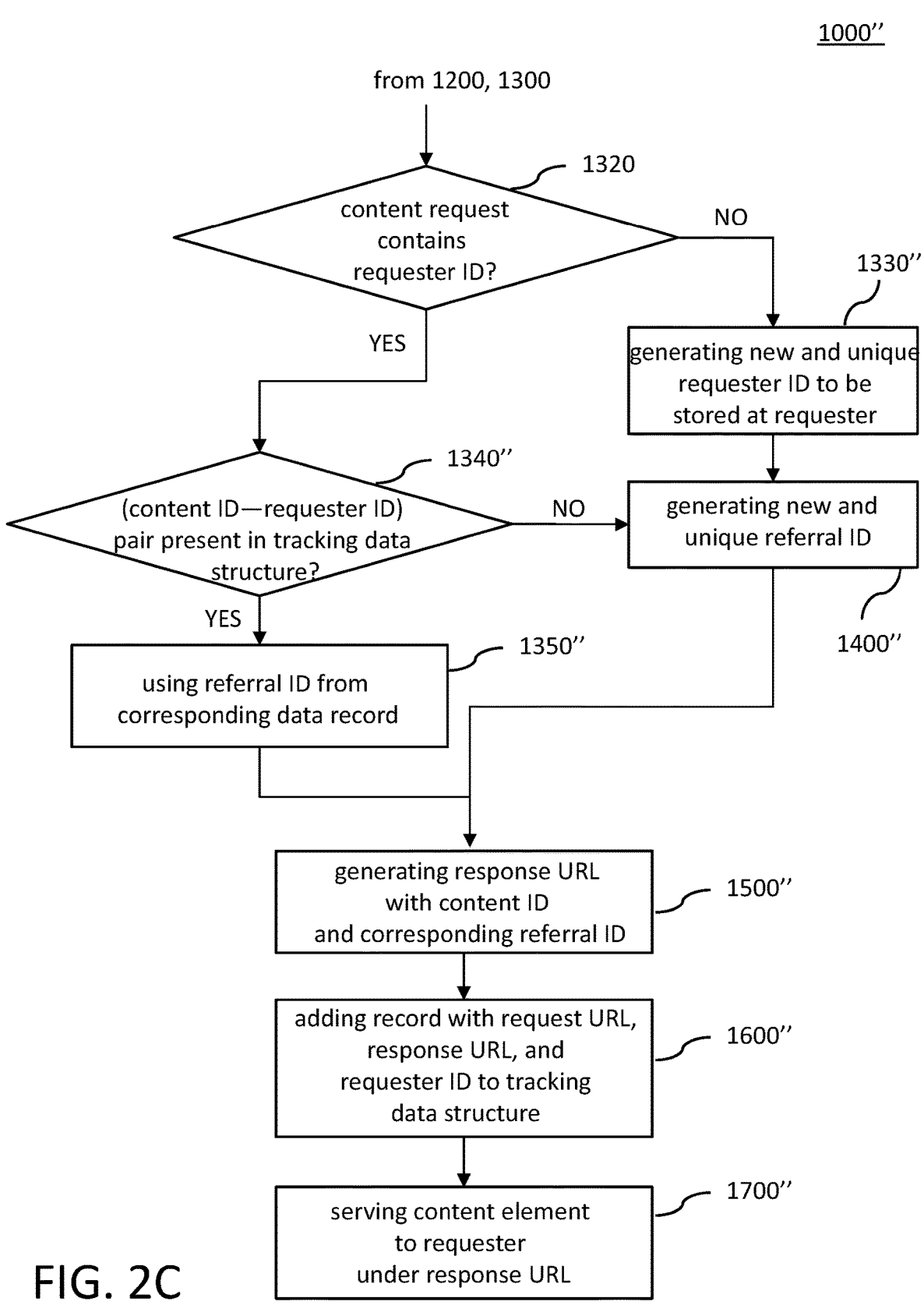

FIG. 2C illustrates a further simplified flowchart 1000" illustrating a further optional embodiment of method 1000. Flowchart 1000" is an extension of flowchart 1000' (cf. FIG. 2B). After the checking step 1320 (already described in FIG. 2B), a further checking step 1340' is performed by the checker module in case the content request already contains a requester identifier. In this further checking step 1340", the checker module 110 checks if for the requester identifier (included in the received content request) a pair of said requester identifier and the received content identifier is already present in a record of the tracking data structure. If so, the response URL module simply reuses 1350" the referral ID of the corresponding data record (i.e., the data record including said pair) to generate 1500" the response URL with the content ID and the corresponding referral ID.

If, however, said pair is not present in the tracking data structure, a new and unique referral ID is generated 1400". That is, in this embodiment, a new and unique referral ID is generated in two situations: (i) if there is no requester ID contained in the received content request, and (ii) if a requester ID is part of the content request but the tracking data structure does not yet have a record which includes a pair of the contained requester ID and the requested content ID. In such cases where a new and unique referral ID is generated 1400", this newly generated referral ID is used for generating the response URL. As a consequence, the data record (including requester ID, request URL and response URL) added 1600" to the tracking data structure can include: (i) the requester ID contained in the content request with an already existing response URL from the tracking data structure, (ii) a new and unique requester ID and a new and unique response URL, or (iii) the requester ID contained in the content request and a new and unique response URL (the 'NO' path from checking step 1340" to generating step 1400"). The requested content element is then served 1700" under the response URL generated in step 1500".

FIG. 3C illustrates TDS 152' where requester '3' has sent two times the same content request using URLreq B. In both cases, the requested content element is served under URLres D. This is because the embodiment of FIG. 2C has found the pair of requester ID '3' and the requested content element to be already in the data records of TDS 152' which was added in response to the first content request of requester '3'. Therefore, the response URL D is reused for the subsequent content request of requester '3'. Using this embodiment, revisits by the same requester with the same content request are served under the same response URL. This supports the development of trust for said requester when interacting with the tracking server as well as trust of receivers of referrals from said requester. Actually, the requester would not even notice when interacting with the tracking server because the response behavior in this case is equivalent to a content element directly served by a content server always under the same response URL. Typically, receiving the same response for the same content request is perceived by a requester as a more reliable and more trustful interaction with the content providing entities in a communication platform. It is to be noted that the tracking server is still able to identify self-loops because a new record is added to TDS 152' each time the tracking server receives the same content request from the same requester.

Figure 2D:
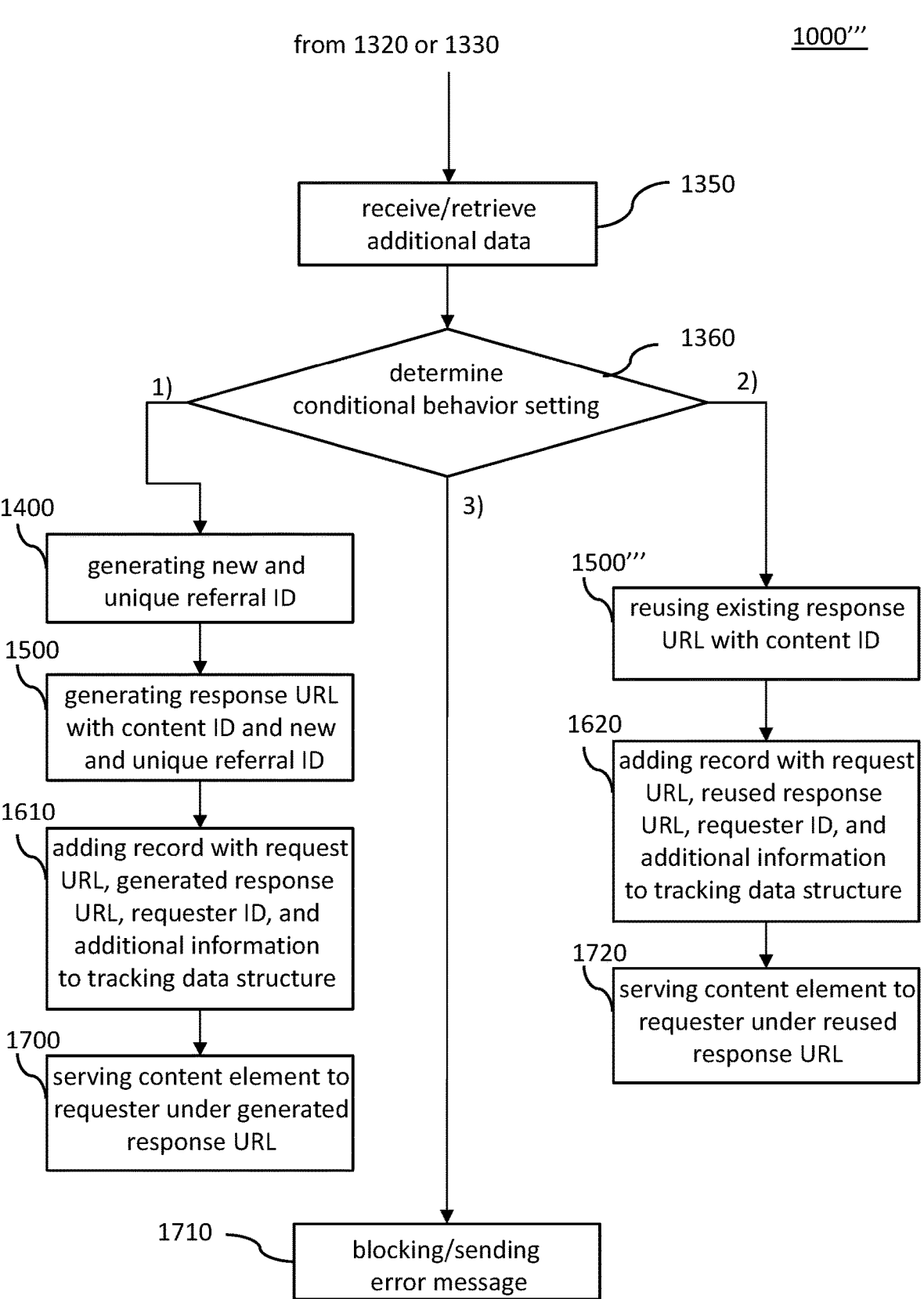

FIG. 2D illustrates a flowchart 1000''' which corresponds to an embodiment of the computer-implemented referral tracking method with a feature allowing the tracking server to dynamically adjust its behavior with regard to the sending of response URLs and/or error messages in response to a content request. In this embodiment, the generated new and unique referral ID and corresponding URL (response URL-res) is not necessarily used to serve the content element requested by a particular content request. To allow this behavior of the tracking server 100 (cf. FIG. 1), TS 100 may implement an optional behavior change module 140 adapted to change the response behavior of the TS 100. This is enabled by additional information which is added 1610, 1620 to the corresponding data record of the tracking data structure. FIG. 3D illustrates an example tracking data structure 153 storing such additional information INFadd for each data record. The column R-ID for the requester identifier is thereby optional (illustrated by the dotted background pattern) and applies when building on the optional embodiments of FIGS. 2B, 2C. That is, the embodiment with the behavior change module 140 can be used in combination with any of the previously described embodiments—with or without requester identifiers. However, it can be advantageous to use the embodiment in particular in combination with a tracking data structure which also stores the requester ID in each data record because this allows to associate additional information directly with respective requesters.

In this embodiment, TS 100 is further adapted to receive 1350 additional data with the content request (e.g., in the request header of an HTTP request as part of the receiving step 1100 (cf. FIG. 2A)). The additional data is associated with further properties associated with the content request. For example, properties such as the IP address of the requester, the time when the content request was submitted, or information about the requester's client 10, 20, 30 may be directly included in the additional data. Other properties may be derived by using a corresponding external service provided by another computer system. For example, received additional data can be sent as an input to an external service to retrieve 1350 further additional data for enriching the already received additional data. For example, TS 100 may use an external geolocation service to derive the geolocation associated with the origin of the content request or the geolocation associated with the origin of the requester. For this purpose, the tracking server sends respective additional data to the external service as input and receives in turn derived additional data. Directly received additional data and derived additional data can finally be added 1610, 1620 in TS 100 to the respective data record associated with the received content request as additional information INFadd.

Turning briefly to FIG. 3D, TDS 153 illustrates a tracking data structure which also stores such additional information INFadd. For certain additional information such as IP address, time, client information, geolocation, the requester identifier R-ID is optional (dotted background pattern). However, when storing additional information at the requester level, R-ID is required. An example for such additional information is the requester's site interaction history which is described in more detail in the following.

Another example of an external service which can be used by TS 100 for further enriching the additional information is a service which is adapted to retrieve a requester's site interaction history based on the requester's earlier received response URLs. For example, Google® Analytics is a service which can provide information on the requester's interaction with a given website, including browsing or purchasing behavior. For example, this becomes possible if the requested content element includes additional tracking logics such as capturing the browser fingerprint (of the requester's client) or the requester's interaction with the tracked site (e.g., purchasing behavior), or if the requester's client stores such additional information about the interaction history. Such external services are commercially available and the skilled person is able to integrate their use into the functionality of the tracking server.

The behavior change module can then apply behavioral decision rules to the obtained additional data to determine 1360 a conditional behavior setting for the tracking server 100. There are three different types 1), 2), 3) of conditional behavior settings which are illustrated in FIG. 2D. In the example of FIG. 2D, only embodiments using requester IDs are illustrated. The first type 1) results in serving 1700 the content element to the requester under a newly generated response URL in a similar way as depicted in FIG. 2B. However, when adding 1610 the new record to the tracking data structure, also the additional information obtained from the additional data is stored with said record in the tracking data structure. In case the decision rules determine a conditional behavior setting of type 2), an already existing response URL is reused 1500" for serving 1720 the content element to the requester. In this case, the record added 1620 to the tracking data structure includes the reused response URL and the respective additional information. In case the behavioral decision rules determine a type 3) conditional behavior setting, the tracking server blocks 1710 a content response to the requester (i.e., does not send a content element at all in response to the content request but rather may send a corresponding error message).

For example, the TS 100 may have a decision rule which uses the additional information as criteria for deciding whether the content element as specified in the content request will be served to the requester under a new and unique response URL (in case it is a valid content element—type 1) conditional behavior setting), or whether, for example, an error message will be sent to the requester (type 3) conditional behavior setting). For example, based on the additional information the tracking server may retrieve information about the requester indicating that the requester is black listed or has shown other previous behavior which prevents the tracking server from serving the requested content element and rather results in an error message (type 3) as the response to the content request.

That is, the additional information may serve as a decision basis for the tracking server to alter its behavior downstream. For example, the tracking server may not serve the content element to requesters who are black listed and reply with a refusal message instead. In another example, the tracking server may generate new and unique response referral IDs and corresponding new response URLs (URLres) only for content requests which contain requester identifiers of requesters that, based on the additional information, share some characteristics, while the tracking server responds to other requesters (not sharing said characteristics) always under the same response referral URL (type 2). Alternative embodiments may also generate a new and unique response URL already before retrieving additional data and determining a conditional behavior setting. When responding to other requesters (not sharing said characteristics) the tracking server may respond always under the same response referral URL (type 2). Such characteristics may for example include purchasing records. Such shared characteristics may also include a membership to a certain group. For example, requesters coming from a first geographic area may be served under a new and unique response URL whereas requesters from a second geographic area may be served under the same response URL. In another example, a decision rule may be defined which serves the content element under the same response URL if the respective content requests have been received by the tracking server (or generated by the requesters) within a predefined time interval, whereas content requests received (or generated) after this predefined time interval will be served under a new and unique response URL. For example, content requests received (or generated) within the last hour may be served under the same response URL.

Figure 5:
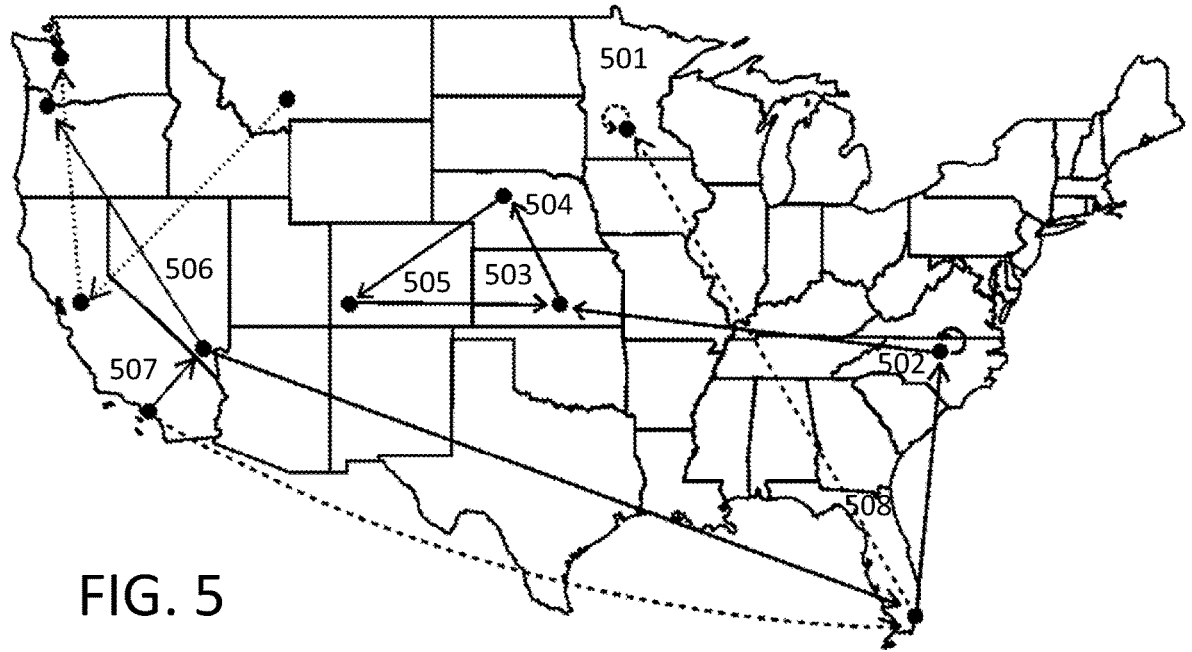
FIG. 5 illustrates further examples of two referral trees in a geographic map based on the geolocation of requesters according to an embodiment.

FIG. 5 illustrates two referral trees (illustrated by the solid and dotted line types) which can be extracted from a tracking data structure. In this example, besides requester identifier, URLreq and URLres, the tracking data structure also stores geolocation data in the additional information of each record of the tracking data structure (cf. TDS 153 in FIG. 3D). In this example, the dashed line type does not represent an additional referral tree but a crossing path within the referral tree illustrated by the solid line type. FIG. 5 illustrates a map of the USA with the US mainland states. The "solid line" referral tree has its root node in California 507 and shows two self-loops in Minnesota 501 and North Carolina 502. The self-loop in Minnesota 501 is based on the crossing path (dashed line type). The nodes in Kansas 503, Nebraska 504 and Colorado 505 are part of a loop within the solid line referral tree (similar to the loop of referral tree 420 in FIG. 4). In this example, however, the root node in California 507 has shared a referral URL for a content element with the node in Nevada 506 via a first path (solid line), and has shared a further referral URL for the same content element with the node in Florida 508 (dashed line). The node in Florida 508 has also received a shared referral URL for the content element from the node in Nevada 506. That is, the node in Florida 508 can now decide which referral URL to use for further content sharing. In the example, the node in Florida has decided to share the content with the node in Minnesota 501 based on the referral URL received from the root node in California 507. However, the sharing of the content element with the node in North Carolina 502 is based on the referral URL received from the node in Nevada 506. In other words, two paths (solid and dashed line types) within the referral tree cross at the node in Florida 508. As a result, the above-described referral tracking embodiment allows to track content sharing at such a level of granularity which even allows to identify such crossings within a referral tree (or also across referral trees as shown in FIG. 4) at the requester level.

Figure 6:
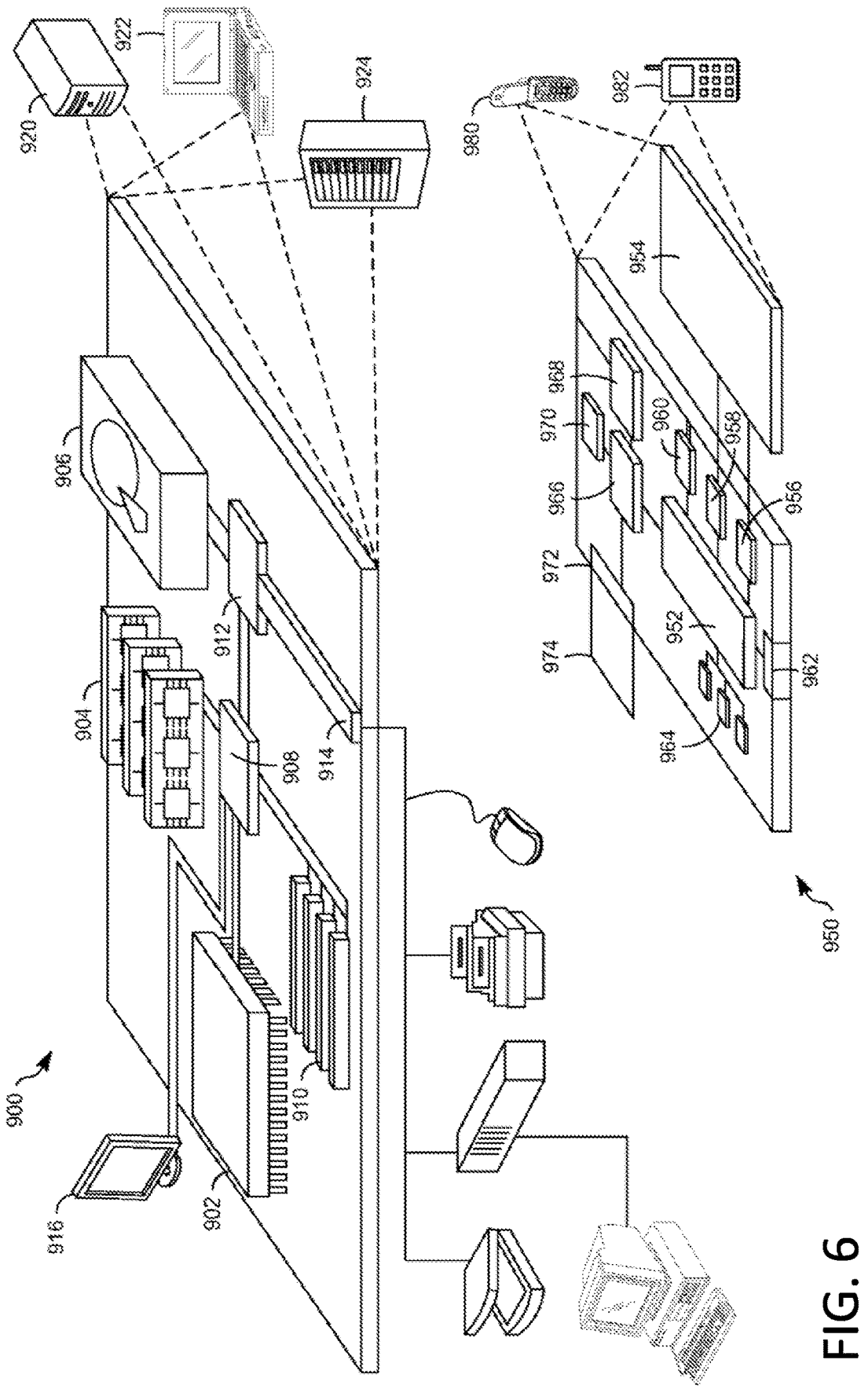
FIG. 6 is a diagram that shows an example of a generic computer device and a generic mobile computer device, which may be used with the techniques described here.

FIG. 6 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device 900 may correspond to the computer system 100 of FIG. 1 (the tracking server). Computing device 950 is intended to represent various forms of mobile devices, such as personal digital assistants, cellular telephones, smart phones, and other similar computing devices. For example, computing device 950 may be used as a frontend by a user to interact with the computing device 900 (e.g., for administration of the tracking server or for doing analyses based on the tracking data structure records). The components shown here, their connections and relationships, and their functions, are meant to be exemplary only, and are not meant to limit implementations described and/or claimed in this document.

Computing device 900 includes a processor 902, memory 904, a storage device 906, a high-speed interface 908 connecting to memory 904 and high-speed expansion ports 910, and a low-speed interface 912 connecting to low-speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a Graphical User Interface ("GUI") [GUI] on an external input/output device, such as display 916 coupled to high-speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high-speed controller 908 manages bandwidth-intensive operations for the computing device 900, while the low-speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or Non-Volatile Random-Access Memory ("NVRAM") memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as Global System for Mobile Communications ("GSM") voice calls, Short Message Service ("SMS"), Electronics Manufacturing Services ("EMS"), or Multimedia Messaging Service ("MMS") messaging, Code Division Multiple Access ("CDMA"), Time Division Multiple Access ("TDMA"), Primary Domain Controller ("PDC"), Wideband Code Division Multiple Access ("WCDMA"), Code Division Multiple Access 2000 ("CDMA2000"), or General Packet Radio Service ("GPRS"), among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or another similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the description.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

19

20

The invention claimed is:

1. A computer-implemented method for tracking sharing of web-content provided by a content server, the method comprising:

receiving, from a requester, a first content request for accessing a content element on the content server, wherein the first content request comprises a first request Uniform Resource Locator (URL) (URLreq) with at least a content identifier (CI) specifying the content element on the content server, and a first referral identifier (RI) being a code indicating that the first request URL was previously used as a first response URL;

generating a new and unique second referral identifier associated with the first content request;

generating a new and unique first referral URL for the first content request as a second response URL (URLres) comprising the content identifier and the second referral identifier;

adding the first request URL (URLreq) and the second response URL (URLres) as a first data record to a tracking data structure;

serving the content element to the requester under the second response URL (URLres);

receiving, from the requester, a second content request for accessing the content element on the content server, wherein the second content request comprises the first request URL (URLreq);

generating a new and unique third referral identifier associated with the second content request;

generating a new and unique second referral URL for the second content request as a third response URL (URLres) comprising the content identifier and the third referral identifier;

adding the first request URL (URLreq) and the third response URL (URLres) as a second data record to the tracking data structure; and serving the content element to the requester under the third response URL (URLres).

2. The method of claim 1, further comprising:

before adding the first data record to the tracking data structure, generating a new and unique requester identifier to be stored at the requester if the first content request does not include a requester identifier; and wherein the first record further comprises either the new and unique requester identifier or the requester identifier included in the first content request, respectively.

3. The method of claim 2, further comprising:

generating the new and unique second referral identifier if the first content request does not include the requester identifier, or if the first content request includes the requester identifier for which no pair of said requester identifier and the received content identifier is present in a record of the tracking data structure;

if the first content request includes the requester identifier for which a pair of said requester identifier and the received content identifier is present in a corresponding record of the tracking data structure, using a corresponding referral identifier from the corresponding record;

generating the second response URL with the received content identifier and the generated new and unique second referral identifier, or with the received content identifier and the corresponding referral identifier of the corresponding record, respectively;

adding the first request URL (URLreq), the second response URL (URLres), and the requester identifier (R-ID) as the first data record to the tracking data structure; and serving the requested content element (CE) to the requester under the second response URL (URLres).

4. The method of claim 1, wherein the tracking server receives additional data with the first content request, the additional data associated with further properties associated with the first content request, wherein each new data record added to the tracking data structure further includes additional information (INFadd) which includes the additional data and/or properties derived from the additional data.

5. The method of claim 4, wherein the additional information (INFadd) is associated with at least one or more of the following: Internet Protocol (IP) address of the requester, time when the first content request was submitted, information about a client of the requester, geolocation associated with an origin of the first content request, geolocation associated with an origin of the requester, and requester's site interaction history.

6. The method of claim 4, further comprising:

changing response behavior of the tracking server by applying behavioral decision rules to the additional information for determining a conditional behavior setting for the tracking server, wherein, dependent on the additional information, the content element is served to the requester under the conditional behavior setting.

7. A tracking server for tracking sharing of web-content provided by a content server, the tracking server including at least one processor and at least one memory storing instructions, which, when executed, cause the at least one processor to:

receive, from a requester, a first content request for accessing a content element on the content server, wherein the first content request comprises a first request Uniform Resource Locator (URL) (URLreq) with at least a content identifier (CI) specifying the content element on the content server, and a first referral identifier (RI) being a code indicating that the first request URL was previously used as a first response URL;

generate a new and unique second referral identifier associated with the first content request;

generate a new and unique first referral URL as a second response URL (URLres) for the first content request, the second response URL comprising the content identifier and the second referral identifier; and add the first request URL (URLreq) and the second response URL (URLres) as a first data record to a tracking data structure:

serve the content element to the requester under the second response URL (URLres);

receive, from the requester, a second content request for accessing the content element on the content server, wherein the second content request comprises the first request URL (URLreq);

generate a new and unique third referral identifier associated with the second content request;

generate a new and unique second referral URL for the second content request as a third response URL (URLres) comprising the content identifier and the third referral identifier;

add the first request URL (URLreq) and the third response URL (URLres) as a second data record to the tracking data structure; and serve the content element to the requester under the third response URL (URLres).

8. The tracking server of claim 7, wherein the instructions, when executed, cause the at least one processor to:

before adding the first data record to the tracking data structure, generate a new and unique requester identifier to be stored at the requester if the first content request does not include a requester identifier; and wherein the first data record further comprises either the new and unique requester identifier or the requester identifier included in the first content request, respectively.

9. The tracking server of claim 8, wherein the instructions, when executed, cause the at least one processor:

to generate the new and unique second referral identifier if the first content request does not include the requester identifier, or if the first content request includes the requester identifier for which no pair of said requester identifier and the received content identifier is present in a record of the tracking data structure;

if the first content request includes the requester identifier for which a pair of said requester identifier and the received content identifier is present in a record of the tracking data structure, to use a corresponding referral identifier from a corresponding record;

to generate the second response URL with the received content identifier and the generated new and unique second referral identifier, or with the received content identifier and the corresponding referral identifier used from the corresponding record, respectively;

to add the first request URL, the second response URL, and the requester identifier as the first data record to the tracking data structure; and to serve the requested content element to the requester under the second response URL.

10. The tracking server of claim 7, wherein the instructions, when executed, cause the at least one processor to: receive additional data with the first content request, the additional data associated with further properties associated with the first content request, wherein each new data record added to the tracking data structure further includes additional information (INFadd) which includes the additional data and/or properties derived from the additional data.

11. The tracking server of claim 10, wherein the additional information (INFadd) is associated with at least one or more of the following: Internet Protocol (IP) address of the requester, time when the first content request was submitted, information about a client of the requester, geolocation associated with an origin of the first content request, geolocation associated with an origin of the requester, and requester's site interaction history.

12. The tracking server of claim 10, wherein the instructions, when executed, cause the at least one processor to:

change response behavior of the tracking server by applying behavioral decision rules to the additional information for determining a conditional behavior setting for the tracking server; and;

dependent on the additional information, serve the content element to the requester under the conditional behavior setting.

13. A computer program product for tracking sharing of web-content provided by a content server, the computer program product being tangibly embodied on a non-transitory computer-readable storage medium and comprising instructions that, when executed by at least one computing device, are configured to cause the at least one computing device to:

receive, from a requester, a first content request for accessing a content element on the content server, wherein the first content request comprises a first request Uniform Resource Locator (URL) (URLreq) with at least a content identifier (CI) specifying the content element on the content server, and a first referral identifier (RI) being a code indicating that the first request URL was previously used as a first response URL;

generate a new and unique second referral identifier associated with the first content request;

generate a new and unique first referral URL for the first content request as a second response URL (URLres) comprising the content identifier and the second referral identifier;

add the first request URL (URLreq) and the second response URL (URLres) as a first data record to a tracking data structure;

serve the content element to the requester under the second response URL (URLres);

receive, from the requester, a second content request for accessing the content element on the content server, wherein the second content request comprises the first request URL (URLreq);

generate a new and unique third referral identifier associated with the second content request;

generate a new and unique second referral URL for the second content request as a third response URL (URLres) comprising the content identifier and the third referral identifier;

add the first request URL (URLreq) and the third response URL (URLres) as a second data record to the tracking data structure; and serve the content element to the requester under the third response URL (URLres).

14. The computer program product of claim 13, wherein the instructions are further configured to cause the at least one computing device to:

before adding the first data record to the tracking data structure, generate a new and unique requester identifier to be stored at the requester if the first content request does not include a requester identifier; and wherein the new data record further comprises either the new and unique requester identifier or the requester identifier included in the first content request, respectively.

15. The computer program product of claim 14, wherein the instructions are further configured to cause the at least one computing device to:

generate the new and unique second referral identifier if the first content request does not include the requester identifier, or if the first content request includes the requester identifier for which no pair of said requester identifier and the received content identifier is present in a record of the tracking data structure;

if the first content request includes the requester identifier for which a pair of said requester identifier and the received content identifier is present in a corresponding record of the tracking data structure, using a corresponding referral identifier from the corresponding record;

generate the second response URL with the received content identifier and the generated new and unique referral identifier, or with the received content identifier and the corresponding referral identifier of the corresponding record, respectively;

adding the first request URL (URLreq), the second response URL (URLres), and the requester identifier (R-ID) as the first data record to the tracking data structure; and serve the requested content element (CE) to the requester under the second response URL (URLres).

16. The computer program product of claim 13, wherein the instructions are further configured to cause the at least one computing device to:

receive additional data with the first content request, the additional data associated with further properties associated with the first content request, wherein each new data record added to the tracking data structure further includes additional information (INFadd) which includes the additional data and/or properties derived from the additional data.

17. The computer program product of claim 16, wherein the additional information (INFadd) is associated with at least one or more of the following: Internet Protocol (IP) address of the requester, time when the first content request was submitted, information about a client of the requester, geolocation associated with an origin of the first content request, geolocation associated with an origin of the requester, and requester's site interaction history.

* * * * *